United States Patent [19]
Cahn et al.

[11] Patent Number: 4,853,193
[45] Date of Patent: Aug. 1, 1989

[54] PROCESS FOR REMOVING $NO_x$ AND $SO_x$ FROM A GASEOUS MIXTURE

[75] Inventors: Robert P. Cahn, Millburn; Boyd E. Hurst, Long Valley, both of N.J.

[73] Assignee: Exxon Research and Engineering Company, Florham, N.J.

[21] Appl. No.: 933,112

[22] Filed: Nov. 21, 1986

Related U.S. Application Data

[63] Continuation-in-part of Ser. No. 817,583, Jan. 10, 1986, abandoned.

[51] Int. Cl.[4] .................. C01B 21/00; C01B 17/00; C01B 17/02; C01C 1/24
[52] U.S. Cl. .................... 423/235; 423/242; 423/545; 423/567 R; 423/570
[58] Field of Search ............... 423/239, 239 A, 235, 423/235 D, 545, 242 A, 242 R, 244 A, 244 R, 567 R, 570

[56] References Cited

U.S. PATENT DOCUMENTS

| | | | |
|---|---|---|---|
| 3,900,554 | 8/1975 | Lyon | 423/235 |
| 4,029,752 | 6/1977 | Cahn | 423/563 |
| 4,051,225 | 9/1977 | Shiga et al. | 423/235 |
| 4,115,515 | 9/1978 | Tenner et al. | 423/235 |
| 4,272,497 | 6/1981 | Takahashi et al. | 423/239 |
| 4,288,420 | 9/1981 | Ito et al. | 423/239 |
| 4,400,363 | 8/1983 | Grochowski et al. | 423/239 |
| 4,507,269 | 3/1985 | Dean et al. | 423/235 |

FOREIGN PATENT DOCUMENTS

| | | | |
|---|---|---|---|
| 52-75658 | 6/1977 | Japan | 423/239 |
| 54-118382 | 9/1979 | Japan | 423/545 |

*Primary Examiner*—Gregory A. Heller
*Attorney, Agent, or Firm*—Exxon Research

[57] ABSTRACT

A combination gas denitrogenation and desulfurization process is provided in which a gaseous mixture comprising $NO_x$, $SO_x$ and $O_2$ is reacted with excess $NH_3$ to reduce the $NO_x$ to $N_2$ and the resulting gaseous effluent comprising the unreacted ammonia and $SO_x$ is passed to a gas desulfurization zone to form an ammonium salt of an acid of sulfur which can be recovered and used as such or converted to elemental sulfur.

13 Claims, No Drawings

4,853,193

PROCESS FOR REMOVING $NO_x$ AND $SO_x$ FROM A GASEOUS MIXTURE

CROSS-REFERENCE TO RELATED APPLICATION

This Application Continuation-in-Part Based on U.S. Ser. No. 817,583, filed Jan. 10, 1986, now abandoned.

BACKGROUND OF THE INVENTION

1. Field of the Invention

The present invention relates to a process for removing nitrogen oxides and sulfur oxides from gaseous mixtures.

2. Description of Information Disclosures

It is known to use ammonia or ammonia precursors to remove nitrogen oxides and sulfur oxides from gaseous mixtures, such as combustion effluents.

U.S. Pat. No. 4,288,420 discloses a process for removing nitrogen oxides and sulfur oxides from a flue gas by reaction in the presence of a catalyst, with excess ammonia to reduce the nitrogen oxides and form ammonium sulfate which is collected with the coal ash particles. The gas leaving the collector passes to a desulfurization unit. The coal ash particles containing ammonium sulfate are heated to release some of their contained ammonia for recycle to the $NO_x$ removal step.

U.S. Pat. No. 4,400,363 discloses first removing $SO_x$ and thereafter removing $NO_x$ from flue gases by reaction with ammonia. See column 3, line 45 to column 4, line 3. The $NO_x$ removal reaction is catalytic.

U.S. Pat. No. 4,272,497 discloses simultaneously removing $NO_x$ and $SO_x$ from waste gases by reacting the gases with ammonia as shown in FIG. 5. The $NO_x$ removal reaction is catalytic. In catalytic deNO$_x$ reaction processes, such as those of U.S. Pat. Nos. 4,400,363 and 4,272,497, the excess ammonia for the deNO$_x$ reaction could not be usefully employed for the $SO_x$ removal stage.

U.S. Pat. No. 4,051,225 discloses a process in which flue gas is treated, catalytically or non-catalytically, with ammonia to remove $NO_x$ and $SO_x$ to produce nitrogen and ammonium hydrogen sulfate. The molar ratio of ammonia to $SO_3$ and the steam concentrations are maintained within specified amounts, thereby severely limiting the amount of excess ammonia available for the deNO$_x$ step. Such a process has a high steam requirement which also results in a high water content in the treated flue gas.

U.S. Pat. No. 3,900,554 discloses a method for removing NO from a combustion gas in the presence of oxygen by reaction with ammonia. Although the reaction can be conducted with as little as 0.4 mole $NH_3$ per mole NO, if it is desired to reduce less than 100% of the NO present in the gas, it is preferred to use a higher mole ratio of ammonia per mole NO and thereby provide an excess amount of ammonia to obtain better results. After the reaction, the excess ammonia must be removed or utilized. See also U.S. Pat. No. 4,507,269.

U.S. Pat. No. 4,029,752 discloses a method for removing sulfur oxides from gaseous mixtures utilizing ammonia to produce elemental sulfur. The gaseous mixture containing sulfur oxides are reacted first with ammonia to form ammonium salts, such as ammonium sulfate or ammonium sulfite, and subsequently the recovered ammonium salts are decomposed at elevated temperatures to form elemental sulfur.

It has now been found that the excess ammonia advantageously employed in the gas denitrogenation process, such as the process described in U.S. Pat. Nos. 3,900,554 and 4,507,269 and remaining in the gaseous effluent of the denitrogenation step, may advantageously be utilized to provide the ammonia required in the gas desulfurization, either for the production of ammonium sulfate or for the production of elemental sulfur, such as the process described in U.S. Pat. No. 4,029,752, and thereby decrease the amount of extraneous ammonia for the desulfurization process by combining the denitrogenation process and the desulfurization process in a specified manner. This integration also permits the use of high excesses of $NH_3$ in the denitrogenation step, thereby increasing the $NO_x$ reduction without causing the emission of a large amount of $NH_3$ to the atmosphere.

SUMMARY OF THE INVENTION

In accordance with the invention, there is provided a combination denitrogenation and desulfurization process which comprises the steps of: (a) contacting a gaseous mixture comprising nitrogen oxides and sulfur oxides in the presence of oxygen and in the absence of a catalyst, with ammonia in a molar amount equal to the sum of about 1.0 to about 3.0 times the moles of said nitrogen oxides plus about 0.01 to about 2.0 times the moles of said sulfur oxides to reduce said nitrogen oxides to nitrogen, at a temperature ranging from about 1300° to about 2200° F.; (b) passing the gaseous effluent resulting from step (a) comprising said nitrogen, said sulfur oxides and unreacted ammonia to a gas desulfurization zone maintained at desulfurization conditions, including a temperature ranging from about 100° to about 400° F. to react said sulfur oxides with, if necessary, additionally added ammonia at a molar ratio of at least 1 mole of ammonia per mole of said sulfur oxides to produce a gaseous effluent and an ammonium salt of an acid of sulfur; and (c) recovering said ammonium salt. The total moles of ammonia added to the process, both for nitrogen oxides removal and sulfur oxides removal, will range from about 1.0 to 2.5 times the sum of the total number of moles of said nitrogen oxides and sulfur oxides.

DESCRIPTION OF THE PREFERRED EMBODIMENT

The gaseous mixture of which the content of one or more types of nitrogen oxides (hereinafter designated $NO_x$) and one or more types of sulfur oxides (hereinafter designated $SO_x$) can be decreased with the process of the present invention include exhaust gases from internal combustion engines either stationary or mobile, tail gases from nitric acid plants or chemical nitration operations, exhaust gases from combustion of fossil fuels in power plants, industrial boilers, etc. Preferably, the gaseous mixture is a combustion effluent, i.e., an effluent derived from a combustion process. The exhaust gases may comprise from about 20 vppm to about 1 volume percent $NO_x$ and from about 0.005 to about 5 volume percent sulfur oxides. When the exhaust gas is derived from a combustion process, the gas may comprise from above 0 to about 20 volume percent $O_2$, typically from 0.1 to 6 volume percent $O_2$.

A gaseous mixture of the type described above, for example, a combustion effluent comprising one or more types of nitrogen oxides and one or more types of sulfur oxides is contacted, in the presence of oxygen, and in the absence of a catalyst, with a reducing agent at conditions to reduce the nitrogen oxides selectively to $N_2$. In accordance with the present invention, an excess amount of ammonia or ammonia precursor such as ammonium hydroxide, ammonium formate, ammonium oxalate, ammonium carbonate and aqueous solutions thereof will be used. By "excess amount" is intended herein a molar ratio of ammonia to $NO_x$ greater (i.e., in excess) than the molar ratio required to reduce all the $NO_x$ present in the gaseous mixture being treated to $N_2$. The stoichiometric $NH_3/NO_x$ ratio is 1/1. Suitable molar amounts of ammonia may be equal to the sum of about 1.0 to 3.0 times the number of moles of $NO_x$ plus about 0.01 to 2.0 times the number of moles of $SO_x$ present in the gaseous mixture being treated, typically from the sum of about the moles of $NO_x$ plus 0.02 times the moles of sulfur oxides to the sum of 2.5 times the moles of nitrogen oxides plus the moles of sulfur oxides. The excess amount of ammonia which may be used will depend to a large extent on the $NO_x$ to $SO_x$ mole ratio in the gas to be treated. For example, when this ratio is $\frac{1}{3}$, and it is desired to remove the $SO_x$ as the ammonium sulfite/sulfate salt, 2 moles of $NH_3$ per mole of $SO_x$ will be required for the $SO_x$ removal. Since, in this example, the $NO_x/SO_x$ ratio in the gas is $\frac{1}{3}$, and the stoichiometric $NH_3/NO_x$ ratio is 1/1, the excess amount of $NH_3$ which can be usefully employed in the $SO_x$ removal step is 6 moles of $NH_3$/mole NO, indicating that a $NH_3/NO_x$ ratio in the feed gas of 7 can be employed in both the $NO_x$ and $SO_x$ removal steps. In general, the total moles of ammonia added to the process, both for nitrogen oxides removal and sulfur oxides removal, will range from about 1.0 to 2.5 times the sum of the total number of moles of said nitrogen oxides and said sulfur oxides. However, as will be described subsequently, it may be advantageous not to add all the stoichiometrically required $NH_3$ for the $SO_x$ removal step as excess amount of $NH_3$ in the feed gas to the $NO_x$ removal step since there may be some undesired thermal decomposition of a fraction of this ammonia during the deNO$_x$ step, as well as some $NH_3$ oxidation. Therefore, the excess amount of $NH_3$ added to the raw feed gas to the deNO$_x$ step is limited to the marginal optimum excess amount, defined as the excess amount above which no improvement in the degree of denitrogenation is achieved. This marginal optimum excess amount of $NH_3$ is in the range of about 0.1 $NH_3/NO_x$ mole ratio to about 5.0, typically 1.0 to 3.0.

While excess amounts of $NH_3$ above this marginal optimum amount can effectively be used up in the $SO_x$ removal step, their presence does not significantly improve the $NO_x$ removal efficiency and may lead to potentially excessive $NH_3$ loss due to thermal and oxidative decomposition. Therefore, if the $NO_x/SO_x$ ratio is such that the required $NH_3$ for the $SO_x$ removal would indicate a tolerable excess amount of $NH_3$ of 5/1, $NH_3/NO_x$ mole ratio, i.e., a 6/1 $NH_3/NO_x$ ratio in the feed gas to the deNO$_x$ step and if the marginal optimum excess amount is only 1/1, then it is preferred to operate as closely as possible to an excess amount of 1/1, i.e., have an $NH_3/NO_x$ mole ratio of 2/1 in the feed to the deNO$_x$ step, but add the additional $NH_3$ prior to the deSO$_x$ step, so that the temperatures will be lower and the $NH_3$ losses due to thermal and oxidative decomposition will be minimized. To reduce all the $NO_x$ present in the gas to $N_2$, at least 1 mole $NH_3$ per mole $NO_x$ is required. The ammonia may be derived from a suitable precursor. The $NO_x$ reduction step may be conducted at a temperature ranging from about 1300° to about 2200° F. When ammonia alone is used as reducing agent, the preferred temperature may range from 1600° to 2200°. When ammonia is used with an additional reducing agent, such as hydrogen, a temperature ranging from about 1300° to about 1600° F. may be used. Suitable amounts of molecular oxygen in the $NO_x$ reduction step include at least about 0.1 volume percent, preferably a range from about 0.1 to 20 volume percent, typically from 0.1 to 6 volume percent based on the gaseous mixture to be treated. The molecular oxygen may be present in the gas to be treated such as in combustion effluents or a suitable amount of oxygen may be added to give the desired amount. Suitable additional reducing agents include paraffins, olefins, aromatic hydrocarbons, oxygenated hydrocarbons, nitrogenated hydrocarbons, sulfonated hydrocarbons, carbon monoxide and hydrogen. Hydrogen is the preferred additional reducing agent suitably added at a hydrogen to ammonia ratio of less than 10, preferably less than 3. However, it should be noted that compared to a stand-alone (i.e., non-integrated) deNO$_x$ process, there is less need for the use of an additional reducing agent in the integrated deNO$_x$/deSO$_x$ process of the present invention because the excess ammonia can be used advantageously to reduce the amount of an additional reducing agent, since the combined operation disposes of the excess $NH_3$ which is presently unused in the effluent of the deNO$_x$ step. It should be noted, however, that the ability to use higher molar ratios of $NH_3/NO_x$ than in stand-alone deNO$_x$ processes also permits the use of wider ratios of additional reducing agents to ammonia than would be possible in stand-alone operations. The pressure during the $NO_x$ reduction step may range from 0.1 atmosphere to 100 atmospheres. The residence time of the reaction of the $NO_x$ and $SO_x$-containing feed gas with the ammonia may range from 0.001 to 10 seconds. Contact of the feed gas with the ammonia (or ammonia precursor) at the $NO_x$ reduction conditions produces a gaseous effluent comprising unreacted ammonia, sulfur oxides, nitrogen and $H_2O$.

At least a portion of the entire $NO_x$ reduction zone gaseous effluent is passed to a desulfurization zone in which the sulfur oxides present in the gaseous effluent react with the unreacted ammonia to form an ammonium salt which may be ammonium sulfite, ammonium sulfate, ammonium bisulfite, ammonium bisulfate, and mixtures. The treated gas is removed from the desulfurization zone and may be vented to the atmosphere. Supplemental ammonia may be added to the desulfurization zone during the desulfurization stage to provide (unreacted+supplemental) a total amount ranging from about 1.0 to about 2.0 moles ammonia per mole $SO_x$. Suitable conditions in the desulfurization zone include a temperature ranging from about 100° to about 400° F., preferably from about 100° to about 200° F., a pressure ranging from about 0.1 atmosphere to about 100 atmospheres, and a residence time ranging from about 0.1 to about 60 seconds. The reaction of the sulfur oxides with the ammonia at these conditions result in the formation of ammonium salts of inorganic acids of sulfur.

The ammonium salts are separated from the gas stream either as solids or in aqueous liquid medium, or as a slurry mixture of solids and liquid. When the ammonium salts are in an aqueous medium, it may be desirable to remove a substantial portion of the water associated with the ammonium salts. The ammonium salts may be recovered and used as such for further use or the recovered salts may be decomposed to form elemental sulfur.

When the ammonium salts are to be recovered as such for use, for example, as fertilizer or as a component of a fertilizer composition, it may be desirable to convert any ammonium sulfite that may be present in the recovered ammonium salts to ammonium sulfate by oxidation in a conventional way such as, for example, by air blowing of the salt solution.

When it is desired to produce elemental sulfur, the ammonia to $SO_x$ mole ratio in the separated ammonium salts should be at least equal to the stoichiometric quantity for conversion of the chemically combined sulfur in the separated ammonium salts to elemental sulfur, for example, a mole ratio of at least 4/3 when all the sulfur in the salts is present as sulfite. When all the sulfur in the separated salts is present as sulfate, the stoichiometric ratio is 2/1. The decomposition of the ammonium salts to elemental sulfur may be performed according to any known method. A method is described in U.S. Pat. No. 4,029,752, the teachings of which are hereby incorporated by reference, in which the ammonium salts are decomposed by high temperature oxidation-reduction reaction into a mixture comprising elemental nitrogen and elemental sulfur in one or two steps. In the one step method, the ammonium salts are introduced into a high temperature reaction zone maintained at a temperature of 500° to 3000° F., preferably 900° to 1500° F. and, optionally, in the presence of a catalyst. When the decomposition of the ammonium salts to elemental sulfur is thermal, a preferred decomposition temperature is above 1200° F., more preferably from about 1500° to about 3000° F. When the decomposition of the ammonium salts to elemental sulfur is performed in the presence of a conventional catalyst, the decomposition temperature may range preferably from about 500° to about 2000° F., more preferably from about 900° to about 1500° F. Alternatively, the ammonia salts may be decomposed in two steps by first decomposing the ammonium salts thermally at a temperature ranging from 225° F. to 800° F. into a gaseous mixture comprising ammonia, sulfur oxides ($SO_2$ and $SO_3$) and water vapor. The gas mixture resulting from the first step, if desired after removal of water vapor, is subsequently introduced into a high temperature reaction zone where the ammonia reacts with the sulfur oxides at a temperature ranging from 500° to 3000° F. to form a reaction product comprising nitrogen and elemental sulfur.

Because it is difficult to accurately simulate, on a laboratory scale, the temperature-time history of combustion effluents as they pass through a combustion apparatus, it is necessary to generate examples by means other than laboratory experiments. Complex chemical reactions occur by a series of elementary reaction steps, and if one knows the rate constants for such steps, a theoretical kinetic mechanism can be developed and verified through comparison with experimental data. An extensive block of kinetic data previously was developed by use of apparatus similar to the apparatus taught in U.S. Pat. No. 3,900,554 and used to determine which elementary reactions would likely be of significance during the reduction of NO by $NH_3$. For many of the reactions, the rate constants were well-known, accurately measured constants of nature. For the remaining reactions, the rate constants were not accurately known and, accordingly, were taken as adjustable parameters, i.e., values for the unknown rate constants were assumed, the reaction kinetics to be expected from these rate constants were calculated and compared with the observed kinetics. Based on this comparison, a new set of rate constants were assumed, etc., until satisfactory agreement between calculation and experimentation were finally obtained. The rate constants for each reaction are set forth in Table I.

TABLE I

KINETIC MODEL
Rate Constant $K = AT^n \exp[-E/(1.98)T]$
M = Any Other Compound
T = Temperature, °K.

| | Reaction | A | N | E |
|---|---|---|---|---|
| 1 | $NH_3 + O = NH_2 + H_2$ | .246 E + 14 | 0.0 | 17071. |
| 2 | $NH_3 + O = NH_2 + OH$ | .150 E + 13 | 0.0 | 6040. |
| 3 | $NH_3 + OH = NH_2 + H_2O$ | .326 E + 13 | 0.0 | 2120. |
| 4 | $HNO + M = NO + H + M$ | .186 E + 17 | 0.0 | 48680. |
| 5 | $HNO + OH = NO + H_2O$ | .360 E + 14 | 0.0 | 0. |
| 6 | $NH_2 + HNO = NH_3 + NO$ | .175 E + 15 | 0.0 | 1000. |
| 7 | $NH_2 + NO = NNH + OH$ | .610 E + 20 | −2.46 | 1866. |
| 8 | $NH_2 + O_2 = HNO + OH$ | .510 E + 14 | 0.0 | 30000. |
| 9 | $NNH + NH_2 = N_2 + NH_3$ | .100 E + 14 | 0.0 | 0. |
| 10 | $NH_2 + O = NH + OH$ | .170 E + 14 | 0.0 | 1000. |
| 11 | $NH_2 + OH = NH + H_2O$ | .549 E + 11 | 0.68 | 1290. |
| 12 | $NH_2 + H = NH + H_2$ | .500 E + 12 | 0.5 | 2000. |
| 13 | $NH + O_2 = HNO + O$ | .300 E + 14 | 0.0 | 3400. |
| 14 | $H_2 + O = H_2O + H$ | .220 E + 14 | 0.0 | 5150. |
| 15 | $H + O_2 = OH + O$ | .220 E + 15 | 0.0 | 16800. |
| 16 | $O + H_2 = OH + OH$ | .180 E + 11 | 1.0 | 8900. |
| 17 | $H + HO_2 = OH + OH$ | .180 E + 11 | 0.0 | 1900. |
| 18 | $O + HO_2 = O_2 + OH$ | .250 E + 15 | 0.0 | 1000. |
| 19 | $OH + HO_2 = H_2O + O_2$ | .480 E + 15 | 0.0 | 1000. |
| 20 | $OH + OH = O + H_2O$ | .500 E + 14 | 0.0 | 1090. |
| 21 | $HO_2 + NO = NO_2 + OH$ | .630 E + 13 | 0.0 | −260. |
| 22 | $H + NO_2 = NO + OH$ | .350 E + 15 | 0.0 | 1500. |
| 23 | $O + NO_2 = NO + O_2$ | .100 E + 14 | 0.0 | 600. |
| 24 | $H + O_2 + M = HO_2 + M$ $H_2O/21$** | .150 E + 16 | 0.0 | −995. |
| 25 | $NNH + M = N_2 + H + M$ | .200 E + 15 | 0.0 | 30000. |
| 26 | $NO_2 + M = NO + O + M$ | .110 E + 17 | 0.0 | 66000. |
| 27 | $NH_3 + M = NH + H + M$ | .480 E + 17 | 0.0 | 93929. |
| 28 | $O + O + M = O_2 + M$ | .138 E + 19 | −1.0 | 340. |
| 29 | $NH_3 + NO = N_2 + H_2O$ | .910 E + 20 | −2.46 | 1866. |
| 30 | $NNH + OH = N_2 + H_2O$ | .300 E + 14 | 0.0 | 0. |
| 31 | $NNH + NO = N_2 + HNO$ | .906 E + 12 | 0.0 | 0. |

**i.e., $A = 21 \times .15 E + 16$ for $H_2O$ as "third body". The "third body" may be any other constituent present.

In the practice of the present invention the content of NO, $O_2$, and $H_2O$ in the effluent stream to be treated is measured or estimated. These initial conditions, as well as measurements or estimates of temperatures in the range of about 1100° K. to about 1500° K. are used in conjunction with the kinetic model hereof with appropriate software to determine the amount of ammonia and an injection point which will give the desired NO reduction. Appropriate software suitable for use herein would be any computer program designed for numerical integration of chemical rate expressions. A non-limiting example of such software is CHEMKIN; A General-Purpose, Problem-Independent, Transportable, Fortran Chemical Kinetics Code Package; R. J. Kee, J. A. Miller, and T. H. Jefferson, an unlimited released Sandia National Laboratory Report SAND80-8003 (1980). This report is also available through the National Technical Information Service, U.S. Department of Commerce.

EXAMPLE OF USE OF KINETIC MODEL

To illustrate the practice of the present invention, the following paper example is presented.

The flue gas conditions of the paper example are typical of combustion products from a boiler firing a medium sulfur-containing coal. For such processes, it is generally desirable to achieve high $deNO_x$ rates with less than 10 vppm residual NH3 in the flue gas. As can be seen from Table II, the deNO$_x$ rate to maintain less than 10 vppm residual NH3 is calculated to be a low value of less than 40%. However, if the residual NH3 can be increased to approximately 150 vppm, then the deNO$_x$ rate of greater than 90%, is expected to be achieved. In this case, a residual NH3 concentration of at least 1400 vppm (equal to the SO2 concentration) could be used since an NH3-based deSO$_x$ process downstream will consume the excess NH3.

It should also be noted that Table II shows that it is desirable to add the bulk of the excess NH3 just upstream of the deSO$_x$ process where the flue gas is colder to conserve consumption of NH3. As shown by the calculated results for NH3/NO$_x$=2.5 and 3.0, there is an increase in the NH3 injection rate of 200 vppm, but the NH3 residual increases only 190 vppm (from 497.5 to 687.5 vppm). Under these two conditions, the NO$_x$ reduction remains essentially constant.

Accordingly, the amount of ammonia which should be injected for NO$_x$ removal purposes should be between 2.5 and 3.0 times the NO$_{xi}$ concentration of 400 vppm, or between 1000 and 1200 vppm. This amount is, as previously specified, between the sum of the moles of NO$_x$ (i.e., 1×400=400 vppm), plus 0.02 times the moles of SO$_x$ (0.02×1800=36 vppm), or 436 vppm, and the sum of 2.5 times the moles of NO$_x$ (2.5×400=1000 vppm), plus the moles of SO$_x$ (1×1800=1800 vppm), or 2800 vppm. When a NH3/NO$_{xi}$ of 2.5 is used, i.e., 1000 vppm of NH3, the residual NH3 in the deNO$_x$ zone effluent, per Table II, is 497.5 vppm; to remove 1400 moles of SO2 quantitatively as (NH4)2 SO3, 2800 vppm of NH3 will be required. Since about 500 vppm are already in the gas, only about 2300 vppm additional ammonia has to be added to accomplish the SO$_x$ removal.

TABLE II

| Flue gas conditions for this calculation: | |
|---|---|
| Temperature range | 1900 to 1500° F. |
| Pressure | 1.0 atmosphere |
| Residence time | 0.2 sec |
| Initial NO$_x$ | 400 vppm |
| Excess O2 | 4.2% |
| H2O | 8.6% |
| SO2 | 1400 vppm |

| NH3$_{(mole)}$/NO$_{xi}$[1] | NH3 Injection Rate | |
|---|---|---|
| | % deNOx | Residual NH3, vppm |
| .25 | 22.1 | 1.5 |
| .5 | 41.9 | 12.9 |
| .75 | 59.5 | 30.8 |
| 1.0 | 74.2 | 59.4 |
| 1.25 | 85.6 | 99.6 |
| 1.50 | 92.6 | 156.4 |
| 2.00 | 97.2 | 317.3 |
| 2.50 | 98.5 | 497.5 |
| 3.00 | 98.9 | 687.5 |
| 3.50 | 99.1 | 879.0 |
| 4.00 | 99.3 | 1076.0 |
| 4.50 | 99.3 | 1272.1 |
| 5.50 | 99.4 | 1666.6 |

[1] NO$_{xi}$ = Initial NO$_x$

What is claimed is:

1. A combination denitrogenation and desulfurization process which comprises the steps of:
    (a) contacting a gaseous mixture comprising nitrogen oxides and sulfur oxides in the presence of oxygen and in the absence of a catalyst, with ammonia in a molar amount equal to the sum of about 1.0 to about 3.0 times the moles of said nitrogen oxides plus about 0.01 to about 2.0 times the moles of said sulfur oxides to reduce said nitrogen oxides to nitrogen, at a temperature ranging from about 1300° to about 2200° F.;
    (b) passing the gaseous effluent resulting from step (a) comprising said nitrogen, said sulfur oxides and unreacted ammonia to a gas desulfurization zone maintained at desulfurization conditions, including a temperature ranging from about 100° to about 400° F., to react said sulfur oxides with ammonia at a molar ratio of at least 1 mole of ammonia per mole of said sulfur oxides to produce a gaseous effluent and an ammonium salt of an acid of sulfur; and
    (c) recovering said ammonium salt.

2. The process of claim 1 wherein said ammonia in step (a) is present in a molar amount ranging from the sum of about the moles of said nitrogen oxides plus 0.02 times the moles of said sulfur oxides to the sum of 2.5 times the moles of said nitrogen oxides plus the moles of said sulfur oxides.

3. The process of claim 1 wherein additional ammonia is added to step (b) to supplement said unreacted ammonia.

4. The process of claim 1 or 3 wherein in step (b) the total amount of ammonia present ranges from about 1.0 to about 2.0 moles of ammonia per mole of sulfur oxides.

5. The process of claim 1 wherein in step (a) said temperature ranges from about 1600° to about 2200° F.

6. The process of claim 1 wherein in step (a) said gaseous mixture is contacted with said ammonia and with an additional reducing agent and wherein said temperature in step (a) ranges from about 1300° to about 1600° F.

7. The process of claim 1 wherein in step (b) said desulfurization conditions include a temperature ranging from about 100° to about 200° F.

8. The process of claim 1 wherein said oxygen in step (a) is present in an amount ranging from about 0.1 to about 20 volume percent based on the volume of said gaseous mixture.

9. The process of claim 1 wherein said recovered ammonium salt is heated to a temperature ranging from about 500° to about 3000° F. to produce elemental sulfur.

10. The process of claim 1 wherein said recovered ammonium salt is decomposed at a temperature ranging from about 225° to 800° F. into a gaseous mixture comprising ammonia and sulfur oxides and, subsequently, the resulting sulfur oxides and ammonia are reacted at a temperature ranging from about 500° to about 3000° F. to produce elemental sulfur.

11. The process of claim 1 wherein said recovered ammonium salt comprises ammonium sulfite and wherein said ammonium sulfite is subjected to oxidation to form ammonium sulfate.

12. The process of claim 1 wherein said gaseous mixture of step (a) is a combustion effluent.

13. The process of claim 1 wherein the total molar amount of ammonia added to both steps (a) and (b) will range from about 1.0 to 2.5 times the sum of the total number of moles of said nitrogen oxides and said sulfur oxides.

* * * * *